US005770102A

United States Patent [19]
Torii et al.

[11] Patent Number: 5,770,102
[45] Date of Patent: Jun. 23, 1998

[54] ICE NUCLEATING-ACTIVE MATERIALS AND ICE BANK SYSTEM

[75] Inventors: Kazuo Torii, Miyagi; Hideo Yamamoto, Ibaragi; Katuhiro Miyaji, Chiba; Norio Murase, Saitama, all of Japan

[73] Assignee: Japan as represented by Director General of Agency of Industrial Science and Technology, Tokyo, Japan

[21] Appl. No.: 796,283

[22] Filed: Feb. 7, 1997

[51] Int. Cl.$^6$ .................................................. C09K 5/06
[52] U.S. Cl. ................................. 252/70; 252/67; 62/56; 62/59; 62/66
[58] Field of Search ............................ 252/70, 67; 62/56, 62/59, 66

[56] References Cited

U.S. PATENT DOCUMENTS 5,620,729  4/1997  Watanabe et al. ...................... 426/327

OTHER PUBLICATIONS

Chemical Abstract No. 122:294590 which is an abstract of PCT Application No. WO 95/09124 (Apr. 1996).
Chemical Abstract No. 126:253012 which is an abstract of Japanese Patent Specification No. 9–040943 (Feb. 1997).
WPIDS Abstract No. 70–01414R which is an abstract of Great Britian Patent Specification No. 1,177,951 (Feb. 1970).
WPIDS Abstract No. 97–175920 which is an abstract of Japanese Patent Specification No. 9–040943 (Feb. 1997).

*Primary Examiner*—Anthony Green
*Attorney, Agent, or Firm*—Oblon, Spivak, McClelland, Maier & Neustadt, P.C.

[57] ABSTRACT

The present invention provides ice nucleating-active materials which are free from problems like corrosiveness against a device owing to the materials used and harmfulness of the materials themselves; and have a function of elevating freezing temperature of water which is effective for releasing an over-cooling state of it, and generates a method for an ice bank system exhibiting a large energy-saving effect. This invention relates to ice nucleating-active materials containing trioctahedral smectites capable of being dispersive in water as effective components, and a method for an ice bank system comprising adding the trioctahedral smectites into a liquid in the ice bank system at a concentration of at least 30 ppm and freezing it by using a freezer.

8 Claims, No Drawings

ICE NUCLEATING-ACTIVE MATERIALS AND ICE BANK SYSTEM

DESCRIPTION OF THE INVENTION

The present invention relates to ice nucleating-active materials having excellent dispersive properties and an excellent function of elevating the freezing temperature of water, and relates to an ice bank system. More specifically, this invention relates to ice nucleating-active materials containing trioctahedral smectites capable of being dispersed in water as effective components, and a method for an ice bank system exhibiting a large energy-saving effect, which comprises adding the trioctahedral smectites into a liquid in the ice bank system at a concentration of at least 30 ppm and freezing it by using a freezer.

BACKGROUND OF THE INVENTION

Since an ice bank system utilizes even latent heat absorbed or discharged when water condenses or fuses, it can achieve a large amount of thermal energy storage at a small volume of about 1/6 to 1/8 as compared to a water bank system. Besides, it can produce ice at night by employing inexpensive night electric power and use the heat of the ice in the daytime, and hence it can reduce cost of electric power. Hence various devices according to the ice bank system have been developed and employed widely for cooling foodstuffs including milk and fruits and keeping them in cold storage, and air conditioning of buildings and individual houses.

The biggest problem in the ice bank system is how to release an over-cooling state of water as quickly as possible. Methods utilizing convection, vibration and impact as techniques for releasing the over-cooling state have been investigated ("Nihon Reitokyokai Ronbunshi", edited by Japan Refrigeration Association, Vol. 8, No. 2, p. 59, 1991); however, they have not as yet come into practical use.

On the other hand, it has been attempted to employ ice nucleating-active materials; for example, ice nucleating-active bacteria and small pieces of wood (Official Gazette of Japanese Laid-open Patent Publication No. 2-44133 and Journal of Applied meteorology, Vol. 20, p. 1013, 1981), mica and graphite (Official Gazette of Japanese Laid-open Patent Publication No. 3-199836 and Journal of the Atmospheric Sciences, Vol. 23, p. 187, 1966), and cholesterol (U.S. Pat. No. 5,168,724 and Nature, Vol. 191, p. 1058, 1961) are known. However, the effectiveness of these materials has not as yet been investigated, and neither the corrosiveness against a device due to the materials used nor the harmfulness of the materials themselves has been investigated.

In addition, in the ice bank system, water is supplied generally by a reduced amount due to evaporation, and hence an ice nucleating-active material added is maintained in the ice bank system over an extremely long period of time. Hence, when an organic material is used as the ice nucleating-active material, decomposition of the material takes place and it is unsuitable for it to be employed in an ice bank system.

Trioctahedral smectites are known materials and classified into hectorite, saponite and stevensite represented by the following formulae (1) to (3) (Mineralogical Society monograph No. 5, edited by G. W. Brindley and G. Brown, p. 170, Mineralogical Society, 1980).

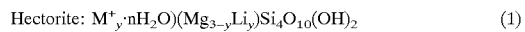

Hectorite: $M^+{}_y \cdot nH_2O)(Mg_{3-y}Li_y)Si_4O_{10}(OH)_2$ (1)

Saponite: $(M^+{}_{x-y} \cdot nH_2O)[Mg_{3-y}(AlFe)_y](Si_{4-x}Al_x)O_{10}(OH)_2$ (2)

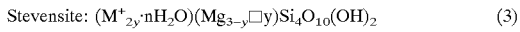

Stevensite: $(M^+{}_{2y} \cdot nH_2O)(Mg_{3-y}\square y)Si_4O_{10}(OH)_2$ (3)

In the above formulae (1) to (3), M represent an alkali metal, □ represents lack of atoms and n the number of water molecules between layers.

It is believed that in the case of hectorite, a layer charge is expressed by lithium substituted with magnesium in its octahedral sheet. In the case of stevensite, a layer charge is expressed by the partial lack of magnesium. In the case of saponite, a layer charge is expressed by aluminum substituted with silicon in its tetrahedral sheet. The value of y in the formula (1) is generally from 0.2 to 0.5, and 0.33 in a preferred composition; the value of y in the formula (2) is generally around 0, and when the value of y is 0, the value of x is from 0.2 to 0.5, and 0.33 in a preferred composition; and the value of y in the formula (3) is generally from 0.1 to 0.3, and 0.17 in a preferred composition.

Processes for synthesizing these smectites are known. Hectorite is exemplified in the Official Gazette of Japanese Patent Publication No. 61-12848/1986. Saponite is exemplified in the Official Gazette of Japanese Patent Publication No. 6-62290/1994. Stevensite is exemplified in the Official Gazette of Japanese Patent Publication No. 63-6485/1988. In addition, compounds of the formulae (1) to (3) wherein a hydroxyl group is substituted with fluorine are synthesized, and it has been known that hectorite, saponite and stevensite not containing fluorine can be used for food (as a filter aid), cosmetics and medical supplies.

However, when using hard water containing calcium ions and magnesium ions, there is no known prior art utilizing trioctahedral smectites for ice nucleating-active material nor for a method of using them in an ice bank system.

In view of the above prior art, effective ice nucleating-active materials which are free from problems, such as corrosiveness, in a device due to the materials used and harmfulness of the materials themselves and a method for an ice bank system have been desired.

SUMMARY OF THE INVENTION

It is the object of the present invention to provide ice nucleating-active materials which are free from problems, such as corrosiveness in a device due to the materials used and harmfulness of the materials themselves functioning to elevate the freezing temperature of water to result it being in an over-cooling state, and a method for an ice bank system having a large energy-saving effect. This invention relates to ice nucleating-active materials containing trioctahedral smectites capable of being dispersive in water as effective components and a method for an ice bank system comprising adding the trioctahedral smectites into a liquid in the ice bank system at a concentration of at least 30 ppm and freezing it by using a freezer. Ice nucleating-active materials according to the present invention are excellent in dispersive properties and cause no precipitate of them when using water with a total hardness of less than 60 ppm, and hence they can be used in the ice bank system without being stirred in the formation of ice.

DETAILED DESCRIPTION OF THE INVENTION AND PREFERRED EMBODIMENTS THEREOF

Applicants have discovered effective ice nucleating-active materials which are free from problems, such as corrosiveness, in a device due to the materials used and harmfulness of the materials themselves and a method for an ice bank system over a long period of time in view of the above prior art. They have found that trioctahedral smectites capable of being dispersive in an aqueous solution efficiently accelerate ice nucleating activity and can achieve ice banking.

It is an object of the present invention to provide ice nucleating-active materials which are free from problems such as corrosiveness, in a device due to the materials used and harmfulness of the material themselves functioning to elevate freezing temperature of water to result it being in an over-cooling state, and a method for an ice bank system having a large energy-saving effect.

A first embodiment of the present invention obviating the above-discussed problems relates to ice nucleating-active materials containing trioctahedral smectites capable of being dispersed in water as effective components and functioning to elevate the freezing temperature of water, wherein trioctahedral smectites are hectorite, saponite, stevensite or mixtures of at least two thereof as a preferred embodiment.

A second embodiment of the present invention obviating the above-discussed problems relates to a method for an ice bank system exhibiting a large energy-saving effect, which comprises adding the trioctahedral smectites into a liquid in the ice bank system at a concentration of at least 30 ppm to result it being in an over-cooling state, and freezing it by using a freezer, wherein trioctahedral smectites are hectorite, saponite, stevensite or mixtures of at least two thereof and the concentration of the trioctahedral smectites added preferably is from 30 to 300 ppm.

Hereunder, the present invention will be described in detail.

Trioctahedral smectites to be used for ice nucleating-active materials according to the present invention are known materials, as described above, and the following materials can be exemplified:

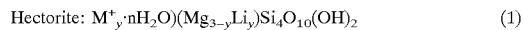

Hectorite: $M^+{}_y \cdot nH_2O)(Mg_{3-y}Li_y)Si_4O_{10}(OH)_2$     (1)

Saponite: $(M^+{}_{x-y} \cdot nH_2O)[Mg_{3-y}(AlFe)\gamma](Si_{4-x}Al_x)O_{10}(OH)_2$     (2)

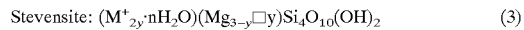

Stevensite: $(M^+{}_{2y} \cdot nH_2O)(Mg_{3-y}\square y)Si_4O_{10}(OH)_2$     (3)

In the above formulae (1) to (3), M represent an alkali metal, $\square$ represents lack of atoms and n the number of water molecules between layers respectively.

It is believed that in the case of hectorite, a layer charge is expressed by lithium substituted with magnesium in its octahedral sheet. In stevensite, a layer charge is expressed by the partial lack of magnesium in its octahedral sheet. In the case of saponite, a layer charge is expressed by aluminum substituted with silicon in its tetrahedral sheet of it. The value of y in the formula (1) is generally from 0.2 to 0.5, and 0.33 in a preferred composition; the value of y in the formula (2) is generally around 0, and when the value of y is 0, the value of x is from 0.2 to 0.5, and 0.33 in a preferred composition; and the value of y in the and the concentration of the trioctahedral smectites to be added preferably from 30 to 300 ppm.

Hereunder, the present invention will be described in detail.

Trioctahedral smectites to be used for ice nucleating-active materials according to the present invention are known materials, as described above, and the following materials can be exemplified:

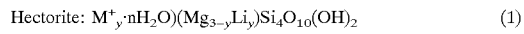

Hectorite: $M^+{}_y \cdot nH_2O)(Mg_{3-y}Li_y)Si_4O_{10}(OH)_2$     (1)

Saponite: $(M^+{}_{x-y} \cdot nH_2O)[Mg_{3-y}(AlFe)\gamma](Si_{4-x}Al_x)O_{10}(OH)_2$     (2)

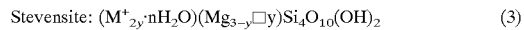

Stevensite: $(M^+{}_{2y} \cdot nH_2O)(Mg_{3-y}\square y)Si_4O_{10}(OH)_2$     (3)

In the above formulae (1) to (3), represent an alkali metal, $\square$ represents lack of atoms and n the number of water molecules between layers respectively.

It is believed that in the case of hectorite, a layer charge is expressed by lithium substituted with magnesium in the octahedral sheet of it. In stevensite, a layer charge is expressed by the partial lack of magnesium in the octahedral sheet of it. In the case of saponite, a layer charge is expressed by aluminum substituted with silicon in the tetrahedral sheet of it. The value of y in the formula (1) is generally from 0.2 to 0.5, and 0.33 in a preferred composition; the value of y in the formula (2) is generally around 0, and when the value of y is 0, the value of x is from 0.2 to 0.5, and 0.33 in a preferred composition; and the value of y in the formula (3) is generally from 0.1 to 0.3, and 0.17 in a preferred composition.

These smectites can be recognized to be trioctahedral smectites since the d value of a peak measured by X-ray powder diffractometry ("Clay Mineralogy, Basic Clay Science", written by Haruo Shiromizu, pp. 57–77, Asakura Shoten, 1988) using Cu-k-alpha rays is from 1.52 to 1.56 Å in (35, 06) of (hk) reflection. The peak of (001) of it is broad and from 12 to 16 Å, and exhibits properties peculiar to smectites being spread to about 17 Å according to an ethylene glycol treatment. Smectites represented by the above formulae (1) to (3) can be specified to be hectorite, saponite and stevensite according to chemical composition, thermal analysis and infrared absorption spectra of them.

These trioctahedral smectites have a layer-like structure with one octahedral sheet containing bivalent metal ions like magnesium sandwiched between two silicate tetrahedral sheets, and the layers are bonded with cations like sodium ions. The space between the layers has characteristics of swelling with water, spreading in the aqueous solution infinitely, and finally dispersing in the solution; hence it exhibits excellent dispersive properties in the aqueous solution, and becomes a transparent sol-like liquid when a small amount thereof is added. When water to be used contains calcium ions or magnesium ions dissolved therein at a high concentration, it often becomes difficult for trioctahedral smectites to disperse therein. Hence it is preferred to employ water with a total hardness value of less than 50 ppm in terms of $CaCO_3$. Generally, water exchanged with ions and water for a boiler have a low total hardness value, and hence the water can be employed suitably as water for an ice bank system according to the present invention. Further, according to a method of this invention, even if the total hardness of water is more than 50 ppm, if it is adjusted or controlled to less than 100 ppm, the water can be used for the above object by increasing the amount of trioctahedral smectites to be added thereto.

The above smectites may he natural or synthesized according to a known method. Hectorite can be synthesized, for example, according to a method by Torii et al. (Official Gazette of Japanese Patent Publication No. 61-12848/1986), saponite, for example, according to a method by Torii et al. (Official Gazette of Japanese Patent Publication No. 6-62290/1994), and stevensite, for example, according to a method by Torii et al. (Official Gazette of Japanese Patent Publication No. 63-6485/1988).

Ice nucleating-active materials according to the present invention contain hectorite, saponite or stevensite singly or mixtures of at least two thereof (mixed at an optional rate) as an effective component. As a form of such ice nucleating-active materials can be exemplified by powder thereof of less than 100 meshes, preferably less than 325 meshes obtained by pulverizing or spray drying.

A second embodiment of the present invention is a method for an ice bank system comprising, employing a known ice bank system, adding the above trioctahedral smectites into a liquid in the ice bank system at a concentration of at least 30 ppm and freezing it by using a freezer. The concentration of the above trioctahedral smectites added is at least 30 ppm, preferably from 40 to 200 ppm. As is apparent from test examples to be described later, an energy-saving effect of 8 to 11% can be obtained at a concentration of 40 to 200 ppm. When the concentration of the above trioctahedral smectites added is less than 30 ppm, the energy-saving effect is small.

Hereunder, the present invention will be described in detail according to specific Test Examples.

TEST EXAMPLE 1

This test was carried out to examine the function of elevating freezing temperature of various ice nucleating-active materials.

1) Preparation of Samples

Ice nucleating-active materials 1–3 according to the present invention prepared by the same method as in Examples 1–3 and known various ice nucleating-active materials shown in Table 1 were dispersed into pure water (temperature of it: 7.6° C.) at a concentration of 250 ppm.

2) Method of the Test

The dispersive properties of each sample were observed with the naked eye, and complete dispersion, excellent dispersion and the formation of precipitates were indicated by, ⊚ ○ and X respectively.

3) Results of the Test

The results of the test are as shown in Table 1. As is apparent from Table 1, in samples with ice nucleating-active materials according to the present invention added thereto, the freezing temperature of the liquid in the ice bank system was significantly elevated and the dispersive properties of the ice nucleating-active materials were excellent. In contrast, in samples with known ice nucleating-active materials added thereto, the elevation of the freezing temperature of it was small or the dispersive properties thereof were poor, or both of these disadvantages occurred; thus, it is apparent that they are undesirable as ice nucleating-active materials. When other ice nucleating-active materials were used, almost the same results were obtained.

Test 1

| Materials added | Freezing temperature (°C.) | Dispersive Property |
|---|---|---|
| Not added (control) | −15 | |
| Material 1 of the invention | −5 | ⊚ |
| Material 2 of the invention | −7 | ⊚ |
| Material 3 of the invention | −7 | ⊚ |
| Mica | −7 | X |
| Graphite | −6 | X |
| Zeolite | −11 | X |

TEST EXAMPLE 2

This test was carried out to examine the concentration of nucleating-active materials necessary in the present invention to be added.

1) Preparation of Samples

Ice nucleating-active materials according to the present invention were prepared by the same method as in Referential Example 1.

2) Method of the Test

The test was carried out in the same manner as in Example 7 except that ice nucleating-active materials according to the present invention were added at the concentrations shown in Table 2, a control with no nucleating-active materials was used, and that the following ice bank system was employed; cooling load, operation time, electric power used, cooling capacity and heat-transfer quantity were measured, and saving rate of electric power and ascending rate of thermal efficiency were calculated from these values according to the following equations.

The ice bank system comprises a freezer (manufactured by Mitsubishi Electric Corporation; 200 V, 50 Hz, 19 kW, refrigerant: R-22, air cooling system), water tank for an ice bank (manufactured by Sanwa Kogyo; storage capacity: 9000 l), a stirrer (manufactured by Satake; 200 V, 50 Hz, 0.75 kW), a cooling coil (manufactured by Sanwa Kogya; inner diameter: 1 inch, STPG sch 40 zinc-plated, 300 m in length), and a clamp-on-power High-Tester as a power meter (manufactured by Hioki; equipped with a digital printer).

Saving rate of electric power and ascending rate of thermal efficiency were calculated according to the following equations.

Saving rate of electric power =
[(electric power used in Control − electric power used in Test Example 2)/electric power used in Control] × 100

Ascending rate of thermal efficiency = [(heat-transfer quantity in Test Example 2 − heat-transfer quantity in Control)/heat-transfer quantity in Control] × 100

3) Results of the Test

The results of the test are as shown in Table 2. As is apparent from Table 2, when adding an ice nucleating-active material at the rate of 40 ppm, 50 ppm, 60 ppm, 100 ppm and 200 ppm, the saving rate of electric power was about 8.3%, about 11%, about 8.0%, about 9,8% and about 9.0%, respectively, when adding it at the rate 40 to 200 ppm, the saving rate of electric power was from about 8 to 11%. Moreover, when adding it at the rate of 30 ppm, the saving rate of electric power was more than about 5.4%. In the present invention, ice banking can be carried out by adding the ice nucleating-active material at a rate of 30 to 300 ppm, preferably 40 to 200 ppm. However, when the material is added thereto at a rate of more than 60 ppm, the saving rate of electric power hardly increases along with the increase thereof and shows an approximately constant value; hence it is believed to be advantageous economically to add the ice nucleating-active material at a rate of 40 to 80 ppm.

When other ice nucleating-active materials of this invention were used, almost the same results were obtained.

Test 2

| Test Item | Control | Amount of ice nucleating-active materials of the invention added (ppm) | | |
|---|---|---|---|---|
| | | 20 | 30 | 40 |
| Cooling load (kcal) | 263.400 | 263.400 | 263.400 | 265.200 |
| Operation time (hrs.) | 7.05 | 6.95 | 6.67 | 6.60 |
| Power used (kW) | 146.51 | 142.65 | 138.58 | 134.31 |
| Cooling capacity (kcal/hr) | 37.362 | 37.899 | 39.490 | 40,182 |
| Heat-transfer quantity (kcal/m · hr) | 124.5 | 126.3 | 131.6 | 133.9 |
| Saving rate of electric power (%) | | 2.63 | 5.41 | 8.32 |
| Ascending rate of thermal efficiency (%) | | 1.45 | 5.70 | 7.55 |
| | 50 | 60 | 100 | 200 |
| Cooling load (kcal) | 269.700 | 269.700 | 269.700 | 269.700 |
| Operation time (hrs.) | 6.50 | 6.57 | 6.54 | 6.61 |
| Power used (kW) | 130.55 | 134.70 | 132.22 | 133.31 |

-continued

Test 2

| Test Item | Amount of ice nucleating-active materials of the invention added (ppm) | | | |
|---|---|---|---|---|
| Cooling capacity (kcal/hr) | 41.492 | 41.050 | 41.239 | 40,802 |
| Heat-transfer quantity (kcal/m · hr) | 138.3 | 136.8 | 137.5 | 136.0 |
| Saving rate of electric power (%) | 10.89 | 8.0 | 9.75 | 9.01 |
| Ascending rate of thermal efficiency (%) | 1.08 | 9.88 | 10.44 | 9.24 |

TEST EXAMPLE 3

This test was conducted in order to examine the energy-saving effect of an ice bank system according to the present invention.
1) Preparation of Samples
Ice nucleating-active materials according to this invention were prepared by the same method as in Referential Example 2.
2) Method of the Test
The test was carried out in the same manner as in Test Example 2 except that ice nucleating-active materials according to this invention were added at a concentration of 55 ppm and that the ice banking was repeated 16 times.
3) Results of the Test
The results of the test are as shown in Table 3. As is apparent from Table 3, the method for the ice bank system of the present invention shows almost the same results even after repeating the test 16 times as the results in the first time. It thus has been shown that the method of the present invention can be carried out repeatedly over a long period of time. When other ice nucleating-active materials of this invention were used, almost the same results were obtained.

Test 3

| | Test division | | |
|---|---|---|---|
| Test Item | Control | 1st | 16th |
| Cooling load (kcal) | 263.400 | 263.400 | 263.400 |
| Operation time (hrs.) | 7.05 | 6.50 | 6.48 |
| Power used (kW) | 146.51 | 130.50 | 130.20 |
| Cooling capacity (kcal/hr) | 37.362 | 41.490 | 41.582 |
| Heat-transfer quantity (kcal/m · hr) | 124.5 | 138.3 | 138.6 |
| Saving rate of electric power (%) | | 10.9 | 11.13 |
| Ascending rate of thermal efficiency (%) | | 11.08 | 11.33 |

REFERENTIAL EXAMPLE 1

Into 300 ml of water held in a one-liter beaker were dissolved 86 g of No. 3 water-glass (manufactured by Koso Kagaku Yakuhin; $SiO_2$: 28%,, $Na_2O$: 9%, molar ratio: 3.22), and 20 ml of a 12N hydrochloric acid solution were added thereto to prepare a silicic acid solution; then into this solution was added a solution comprising 55 g of a magnesium chloride hexahydrate of first-rate reagent (manufactured by Kanto Kagaku; purity: 98%) dissolved in 100 ml of water to prepare a silicic acid-magnesium salt homogeneous solution; this homogeneous solution was dropped into 200 ml of 28% ammonia water under stirring over 3 minutes, and the obtained precipitates were filtered, washed with water sufficiently until the smell of the ammonia disappeared and transferred into a stainless steel autoclave with one liter capacity (manufactured by Koatsu Kagaku); then a solution comprising 2.8 g of a lithium hydroxide hydrate dissolved in 50 ml of water was added thereto to obtain a slurry, and they were reacted at a pressure of 15.9 kg/cm$^2$ and at a temperature of 200° C. for 3 hours and cooled; then the reaction product was taken out, dried and pulverized to obtain about 42 g of hectorite.

REFERENTIAL EXAMPLE 2

Into 300 ml of water in a one-liter beaker were dissolved 86 g of No. 3 water-glass (manufactured by Koso Kagaku Yakuhin; $SiO_2$: 28%, $Na_2O$: 9%, molar ratio: 3-22), and 20 ml of a 12N hydrochloric acid solution were added thereto to prepare a silicic acid solution; then into this solution was added a solution comprising 60 g of a magnesium chloride hexahydrate first-rate reagent (manufactured by Kanto Kagaku; purity: 98%) dissolved in 100 ml of water to prepare a silicic acid-magnesium salt homogeneous solution; this homogeneous solution was dropped into 300 ml of a 2N sodium hydroxide solution under stirring over 5 minutes, and the obtained precipitates were filtered, washed with water sufficiently until the chlorine reaction disappeared and transferred into a stainless steel autoclave with one liter capacity (manufactured by Koatsu Kagaku); then a solution comprising 2.8 g of a lithium hydroxide hydrate dissolved in 50 ml of water was added thereto to obtain a slurry, and they were reacted at a pressure of 41.0 kg/cm$^2$ and at a temperature of 250° C. for 2 hours and cooled; then a reaction product was taken out, dried and pulverized to obtain about 45 g of hectorite.

REFERENTIAL EXAMPLE 3

Into 400 ml of water in a one-liter beaker were dissolved 79.4 g of No. 3 water-glass (manufactured by Koso Kagaku Yakuhin; $SiO_2$: 28%, $Na_2O$: 9%, molar ratio: 3.22), and 23 ml of 16N nitric acid were added thereto at once under stirring to prepare a silicic acid solution; then into this solution was added a solution comprising 62.2 g of a magnesium chloride hexahydrate first-rate reagent (manufactured by Kanto Kagaku; purity: 98%) and 7.4 g of an aluminum chloride hexahydrate first-rate reagent (manufactured by Kanto Kagaku; purity: 98%) dissolved in 100 ml of water to prepare a silicic acid-magnesium salt homogeneous solution; this homogeneous solution was dropped into 260 ml of ammonia water under stirring over 5 minutes, and the obtained precipitates were filtered and washed sufficiently with water; then a solution comprising 1.4 g of sodium hydroxide dissolved in 20 ml of water was added there to obtain a slurry, and they were transferred into a stainless steel autoclave with one liter capacity (manufactured by Koatsu Kagaku) and reacted at a pressure of 87 kg/cm$^2$ and at a temperature of 300° C. for 3 hours and cooled; then a reaction product was taken out, dried and pulverized to obtain about 43 g of saponite.

REFERENTIAL EXAMPLE 4

Into 400 ml of water in a one-liter beaker were dissolved 86 g of No. 3 water-glass (manufactured by Koso Nagaku Yakuhin; $SiO_2$: 28 t, $Na_2O$: 9%, molar ratio: 3.22), and 25 ml of 16N nitric acid were added thereto at once under stirring to prepare a silicic acid solution; then into this solution was added a solution comprising 55 g of a magnesium chloride hexahydrate first-rate reagent (manufactured by Kanto Kagaku; purity: 98%) dissolved in 100 ml of water to prepare a silicic acid-magnesium salt homogeneous solution; this homogeneous solution was dropped into 380 ml of a 2N sodium hydroxide solution under stirring over 5 minutes, and the obtained precipitates were filtered and washed sufficiently with water; then a solution comprising 3 g of sodium hydroxide dissolved in 20 ml of water was added thereto obtain a slurry, and they were transferred into a stainless steel autoclave with one liter capacity (manufactured by Koatsu Kagaku) and reacted at a pressure of 41 kg/cm² and at a temperature of 250° C. for 3 hours and cooled; then a reaction product was taken out, dried and pulverized to obtain about 42 g of stevensite.

EXAMPLES

Hereunder, the present invention will be described in more detail according to Examples; however, the present invention is not restricted to the following Examples.

EXAMPLE 1

Eleven kilograms of hectorite prepared by the same method as in Referential Example 1 were pulverized by a grinder (manufactured by Ishikawa Kojo), sieved by a 200-mesh sieve and sealed into a synthetic resin-made case each containing one kilogram to obtain 10 cases of the ice nucleating-active material.

EXAMPLE 2

Eleven kilograms of saponite prepared by the same method as in Referential Example 3 were pulverized by a grinder (manufactured by Ishikawa Kajo); sieved by a 200-mesh sieve and sealed into a synthetic resin-made case each containing one kilogram to obtain 10 cases of the ice nucleating-active material.

EXAMPLE 3

Eleven kilograms of stevensite prepared by the same met-hod as in Referential Example 4 were pulverized by a grinder (manufactured by Ishikawa Kojo), sieved by a 200-mesh sieve and sealed into a synthetic resin-made case each containing one kilogram to obtain 10 cases of the ice nucleating-active material.

EXAMPLE 4

Hectorite (5.5 kg) prepared by the same method as in Referential Example I and 5.5 kg of saponite prepared by the same method as in Referential Example 3 were pulverized by a grinder (manufactured by Ishikawa Kojo), sieved by a 200-mesh sieve and sealed into a synthetic resin-made case each containing one kilogram to obtain 10 cases of the ice nucleating-active material.

EXAMPLE 5

Hectorite (5.5 kg) prepared by the same method as in Referential Example 1 and 5.5 kg of stevensite prepared by the same method as in Referential Example 4 were pulverized by a grinder (manufactured by Ishikawa Kojo), sieved by a 200-mesh sieve and sealed into a synthetic resin-made case each containing one kilogram to obtain 10 cases of the ice nucleating-active material.

EXAMPLE 6

Saponite (5.5 kg) prepared by the same method as in Referential Example 3 and 5.5 kg of stevensite prepared by the same method as in Referential Example 4 were pulverized by a grinder (manufactured by Ishikawa Kojo), sieved by a 200-mesh sieve and sealed into a synthetic resin-made case each containing one kilogram to obtain 10 cases of the ice nucleating-active material.

EXAMPLE 7

Into a 1000-liter-capacity bank system equipped with 37.6 m of a coil-like stainless steel pipe with an inner diameter of ¾ inches were introduced 900 l of city water (temperature of it: 7.6° C.) with a total hardness of 45.9 ppm containing $Ca^{2+}$ of 16.7 ppm and $Mg^{2+}$ of 1.2 ppm; 45 g of the ice nucleating-active material (concentration: 50 ppm) of Example 1 were added thereto, the mixture was stirred and dispersed homogeneously, and then cooled by an air-cooling 3.7 kW freezer (manufactured by Mitsubishi Electric Corporation; refrigerant; R-22) to carry out ice banking.

The time required for the formation of ice with a thickness of 40 mm on the coil, electric power used and an average heat-transfer quantity in the coil were measured; as a result of comparing them with those of Comparative Example 1 with no ice nucleating-active material, it was found that the time required for the formation of the ice (5 hours and 30 minutes) was improved by about 6.9%, electric power used (20 kW) by about 9.5%, and an average heat-transfer quantity in the coil (142.5 kcal/m hour) by about 7.5% respectively.

COMPARATIVE EXAMPLE 1

Ice banking was carried out by the same method as in Example 7 except that no ice nucleating-active material was added. As a result of measuring the time required for the formation of ice with a thickness of 40 mm on the coil, electric power used and an average heat-transfer quantity in the coil, it was found that the time required for the formation of the ice was 5 hours and 55 minutes, electric power used 22.1 kW, and an average heat-transfer quantity in the coil 132.6 kcal/m hour.

EXAMPLE 8

Into a bank system with 1000 liter capacity equipped with 37.6 m of a coil-like stainless steel pipe with an inner diameter of ¾ inches were introduced 900 liter of city water (water temperature: 7.6° C.) used in Example 7; 36 g of the ice nucleating-active material (concentration: 40 ppm) of Example 2 were added thereto, the mixture was stirred and dispersed homogeneously, and then cooled by an air-cooling 3.7 kW freezer (manufactured by Mitsubishi Electric Corporation; refrigerant: R-22) to carry out ice banking.

The time required for the formation of ice with a thickness of 40 mm on the coil, electric power used and an average heat-transfer quantity in the coil were measured; as a result of comparing them with those of Comparative Example 1 with no ice nucleating-active material, it was found that the time required for the formation of the ice (5 hours and 31 minutes) was improved by about 6.8%, electric power used (20.2 kW) by about 8.6%, and an average heat-transfer quantity in the coil (142.0 kcal/m.hour) by about 7.1% respectively.

EXAMPLE 9

Into a bank system with 1000 liter capacity equipped with 37.6 m of a coil-like stainless steel pipe with an inner diameter of ¾ inches were introduced 900 liter of city water (water temperature: 7.6° C.) used in Example 7; 54 g of the ice nucleating-active material (concentration: 60 ppm) of Example 3 were added thereto, the mixture was stirred and dispersed homogeneously, and then cooled by an air-cooling 3.7 kW freezer (manufactured by Mitsubishi Electric Corporation; refrigerant: R-22) to carry out ice banking.

The time required for the formation of ice with a thickness of 40 mm on the coil, electric power used and an average heat-transfer quantity in the coil were measured; as a result of comparing them with those of Comparative Example I with no ice nucleating-active material, it was found that the time required for the formation of the ice (5 hours and 29 minutes) was improved by about 7.3%, electric power used (20.1 kW) by about 9.0%, and an average heat-transfer quantity in the coil (143.1 kcal/m.hour) by about 7.9% respectively.

EXAMPLE 10

Into a bank system with 1000 liter capacity equipped with 37.6 m of a coil-like stainless steel pipe with an inner diameter of ¾ inches were introduced 900 liter of city water (temperature of it: 7.6° C.) used in Example 7; 49.5 g of the ice nucleating-active material (concentration: 55 ppm) of Example 3 were added thereto, the mixture was stirred and dispersed homogeneously, and then cooled by an air-cooling 3.7 kW freezer (manufactured by Mitsubishi Electric Corporation; refrigerant: R-22) to carry out ice banking.

The time required for the formation of ice with a thickness of 40 mm on the coil, electric power used and an average heat-transfer quantity in the coil were measured; as a result of comparing them with those of Comparative Example 1 with no ice nucleating-active material, it was found that the time required for the formation of the ice (5 hours and 29 minutes) was improved by about 7.3%, electric power used (19.9 kW) by about 10.0%, and an average heat-transfer quantity in the coil (143.3 kcal/m.hour) by about 8.1% respectively.

As described above in detail, the present invention relates to ice nucleating-active materials containing trioctahedral smectites capable of being dispersed in water as effective components and a method for an ice bank system comprising adding the trioctahedral smectites into a liquid in an ice bank system at a concentration of at least 30 ppm and freezing it by using a freezer.

The advantageous effects exhibited by the present invention are as follows:

1) It results in an over-cooling state of the liquid and exhibits a large energy-saving effect.
2) It can elevate freezing temperature of the liquid by the addition thereof into the liquid for ice banking.
3) When employing water with a total hardness of less than 60 ppm, ice nucleating-active materials according to the present invention exhibit excellent dispersive properties, they not precipitating; hence it is unnecessary to stir them in the ice bank system in the process of formation of ice.
4) No corrosion results in a device due to the use of the ice nucleating-active materials.
5) No problem of harmfulness of the ice nucleating-active materials themselves is present.
6) The method for the ice bank system of the present invention can be carried out repeatedly over a long period of time.

What is claimed is:

1. In a method for preparing an ice bank system, the improvement for obtaining an energy-saving effect comprising adding a trioctahedral smectite dispersable in water to a liquid in said ice bank system at a concentration of at least 30 ppm to result in dissolving an over-cooling state of said liquid, and freezing the resulting liquid.

2. In the method for preparing the ice bank system as claimed in claim 1, wherein the trioctahedral smectite is hectorite, saponite, stevensite or mixtures of at least two thereof.

3. In the method for preparing the ice bank system as claimed in claim 1, wherein the water used contains calcium ions and magnesium ions with a total hardness of less than 60 ppm in terms of $CaCO_3$.

4. In the method for preparing the ice bank system as claimed in claim 1, wherein the concentration of the trioctahedral smectites is from 40 to 200 ppm.

5. The ice bank system as prepared by the method of claim 1.

6. The ice bank system as prepared by the method of claim 2.

7. The ice bank system as prepared by the method of claim 3.

8. The ice bank system as prepared by the method of claim 4.

* * * * *